Aug. 18, 1942.      R. K. WEILAND      2,293,231
CIRCULAR SAW CONDITIONER
Filed Aug. 17, 1940      3 Sheets-Sheet 1
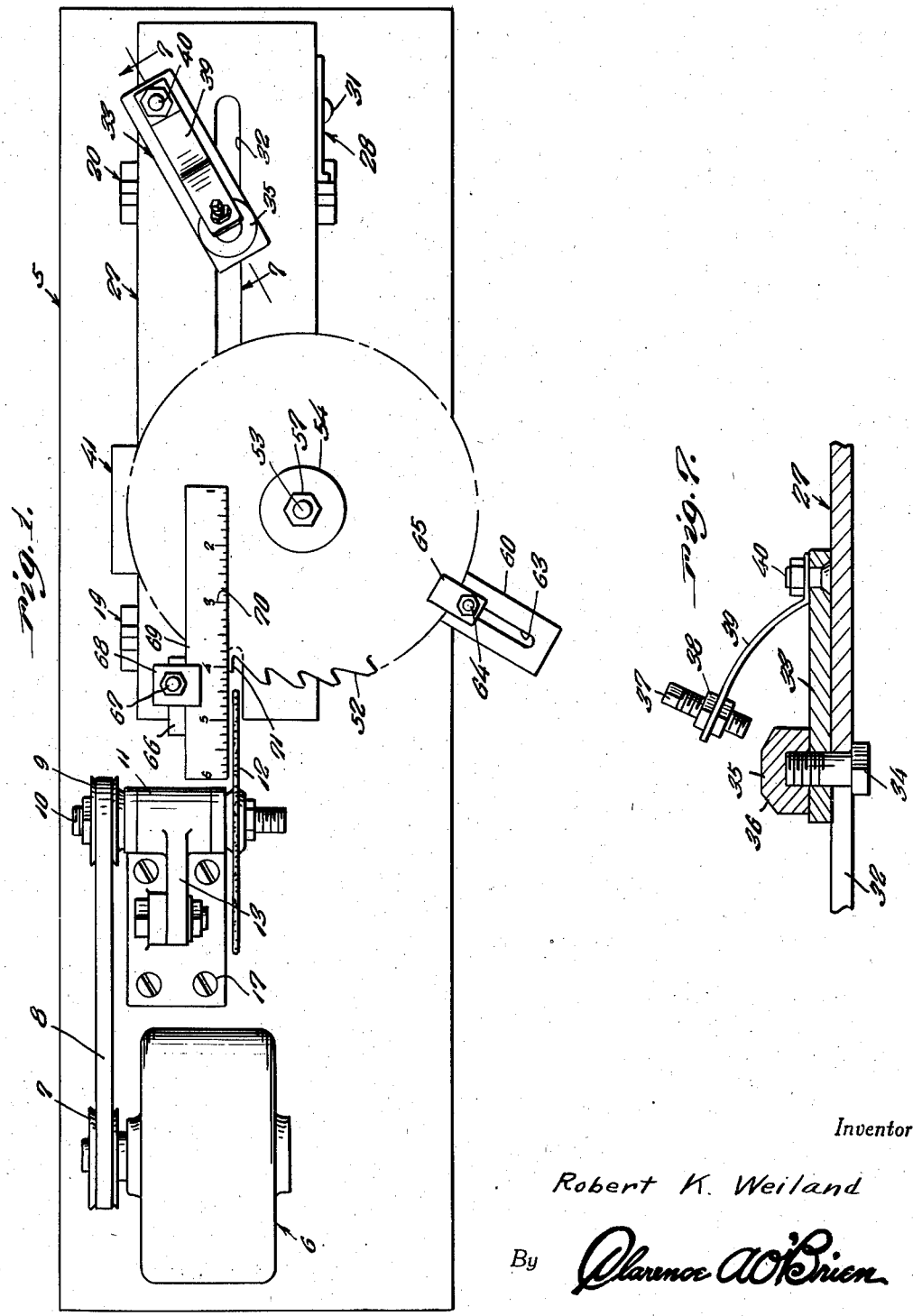
Inventor
Robert K. Weiland
By Clarence A. O'Brien
Attorney

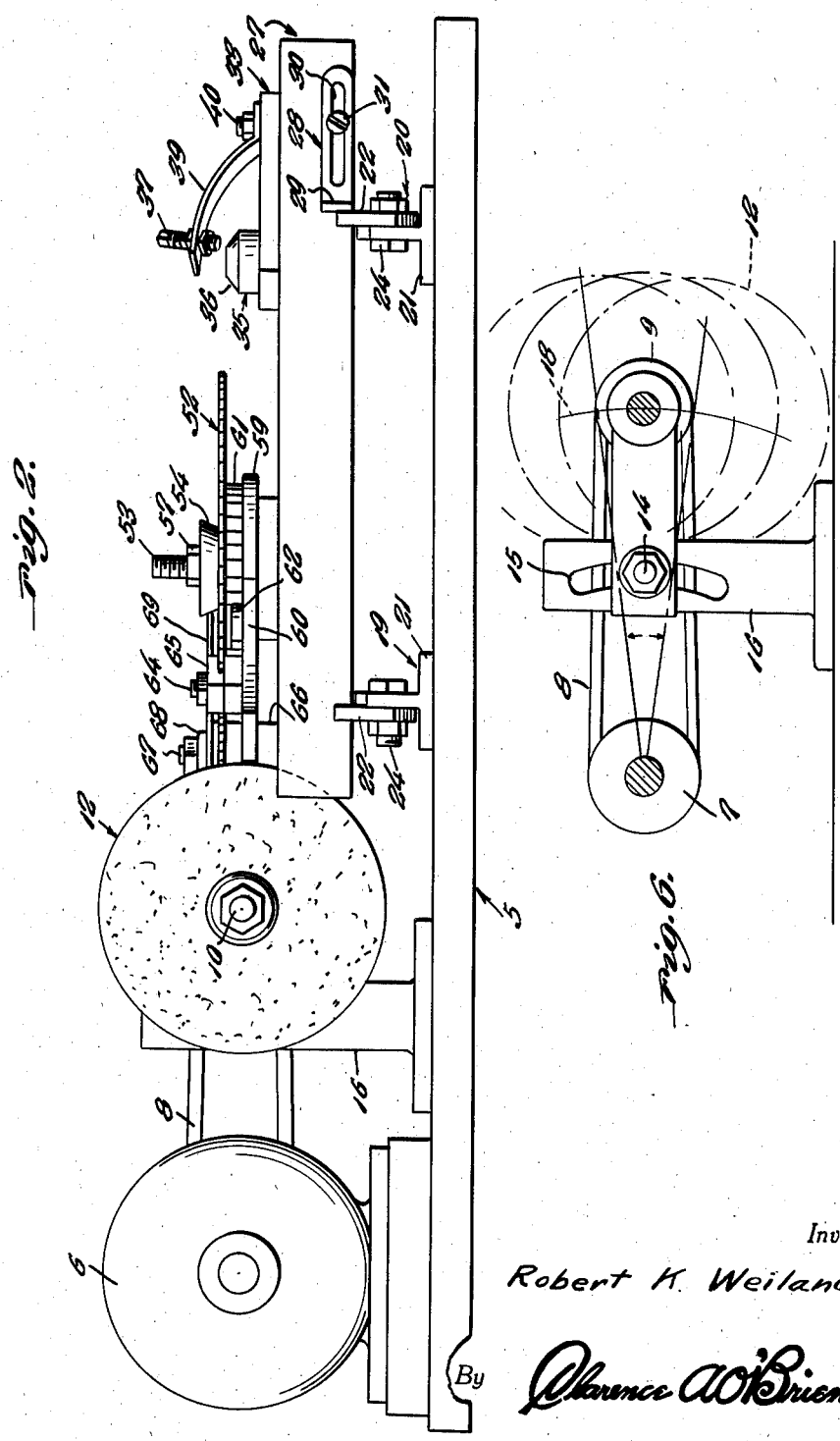

Aug. 18, 1942.   R. K. WEILAND   2,293,231
CIRCULAR SAW CONDITIONER
Filed Aug. 17, 1940    3 Sheets-Sheet 3
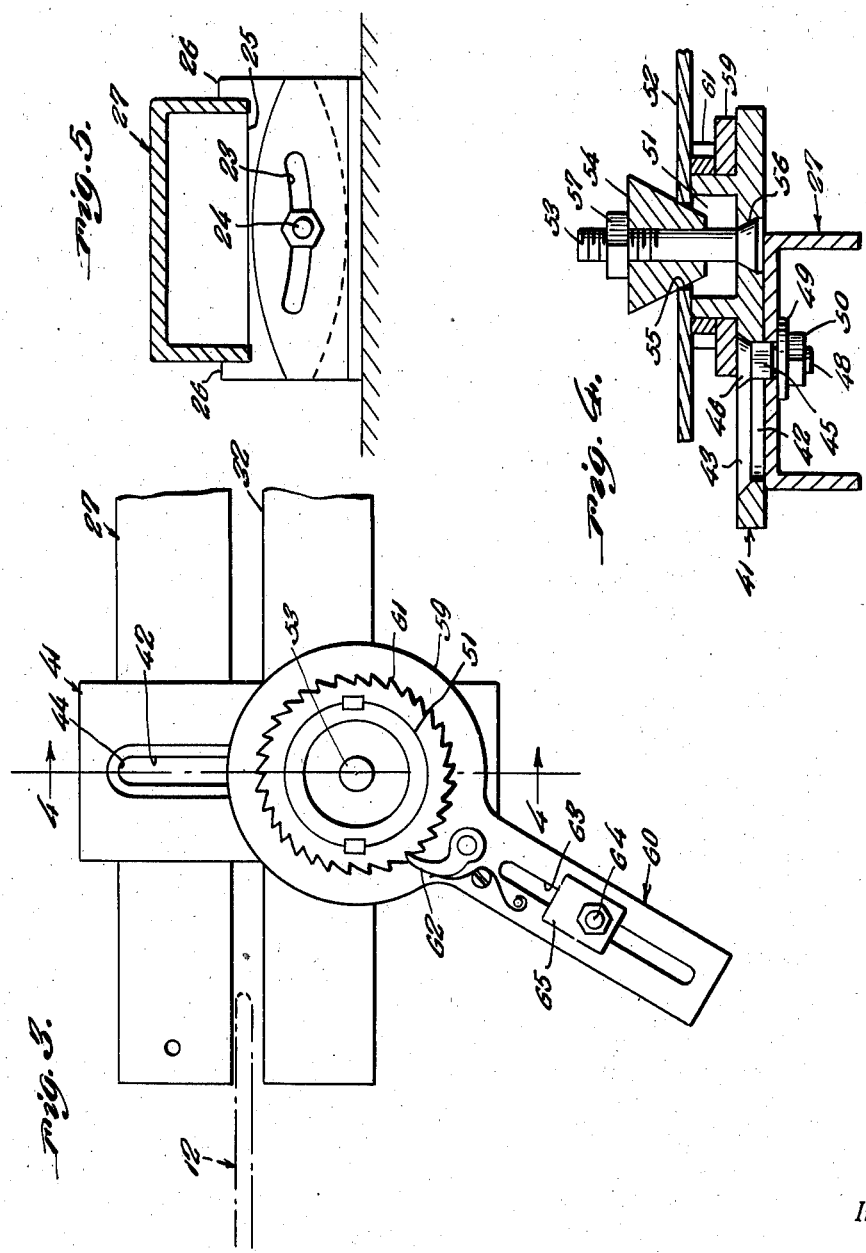
Inventor
Robert K. Weiland
By Clarence A. O'Brien
Attorney Patented Aug. 18, 1942

2,293,231

UNITED STATES PATENT OFFICE 2,293,231

CIRCULAR SAW CONDITIONER

Robert K. Weiland, West Palm Beach, Fla.

Application August 17, 1940, Serial No. 353,147

1 Claim. (Cl. 76—43)

My invention relates generally to means for reconditioning circular saws, and particularly to apparatus adjustable to hold circular saws of different sizes and tooth contours relative to an emery wheel and relative to a tooth setting anvil and hammer, whereby geometrically correct reconditioning of the teeth of the circular saw is provided for, and the primary object of my invention is to provide a simple and efficient arrangement of this character which greatly facilitates efficient performance of the necessary operations.

Other important objects and advantages of my invention will be apparent from a reading of the following description taken in connection with the drawings, wherein for purposes of illustration, I have shown a preferred embodiment of my invention.

In the drawings—

Figure 1 is a general top plan view of an arrangement in accordance with the invention showing a circular saw in place thereon.

Figure 2 is a general side elevational view of Figure 1.

Figure 3 is an enlarged fragmentary top plan view with the circular saw removed to expose the ratchet mechanism.

Figure 4 is a transverse vertical sectional view taken through Figure 3 approximately on the line 4—4 and looking toward the right in the direction of the arrows.

Figure 5 is a transverse vertical sectional view taken through the casting.

Figure 6 is a longitudinal vertical sectional view taken through the emery wheel arbor and driving motor and showing in dotted lines different adjusted positions of the emery wheel.

Figure 7 is an enlarged fragmentary longitudinal vertical sectional view taken through Figure 1 approximately on the line 7—7 and looking upwardly in the direction of the arrows.

Referring in detail to the drawings, the numeral 5 generally designates a suitably elongated horizontal base or table on one end of which is mounted a suitable electric motor 6 having a drive pulley 7 over which is trained a belt 8 which is also trained over the pulley 9 on the emery wheel arbor 10 which extends forwardly through the bearing housing 11 to reappear on the opposite side thereof and support a selected emery wheel 12. The housing 11 has a lateral arm 13 which is traversed by a clamping bolt 14 which traverses an arcuate slot 15 in the arbor standard 16 which is fastened by suitable means indicated by the numeral 17 to the base 5 to the right of the motor 6 for the purpose of permitting adjustment of the axis of the emery wheel along the arc 18 whose center of curvature is the axis of the motor pulley 7, in accordance with the bevel of the cutting edge of the tooth of the saw to be ground. The curvature of the slot 15 is concentric with that of the curvature of the arc 18.

As will be apparent from the foregoing and from inspection of the drawings, by virtue of the described mounting and drive for the emery wheel 12, said wheel is adjustable vertically in a vertical plane into different set positions, and as will hereinafter more clearly appear, the saw is mounted in a horizontal plane. Hence, under adjustment of the emery wheel 12 the relation of the periphery, or cutting edge, is varied relative to the saw teeth so as to cut different bevels on the teeth.

To the right of the emery wheel assembly are brackets 19 and 20, respectively, each of which comprises an inverted T-shaped element 21 which is fastened to the top of the table 5 and a transversely elongated plate or block 22 which is positioned along the outer side of the standard portion of the member 21, both members having matching arcuate slots 23 through which extends a clamping bolt 24. The upper edges of the blocks 22 are cut away between the opposite ends thereof to provide the limiting uprights 26 which engage opposite sides of the inverted channel-shaped casting 27, with the casting extending slidably between and beyond the brackets 19 and 20 as indicated in Figure 2. The arrangement of the brackets 19 and 20 permits forward and rearward tilting adjustment of the casting 27 relative to the base 5 and relative to the emery wheel 12, so as to provide for holding the circular saw at the proper angles to provide the desired level on the teeth of the saw being reconditioned. On the front side of the casting 27 adjacent the right hand end thereof is a longitudinally adjustable stop 28 which has a lateral foot 29 to engage the block 22 of the bracket 20 to limit adjustment of the casting 27 in the direction of the emery wheel, ensuring uniform grinding. The stop consists of an elongated plate formed with a slot 30 through which passes a clamping screw 31 threaded into the side of the said casting.

The casting 27 is provided approximately centrally with an elongated slot 32 which provides for longitudinal and angular adjustment of the tooth setting unit and the saw mounting unit. The tooth setting unit consists of relatively heavy elongated plate 33 resting on the top of the casting 27 and provided with a stud 34 extending upwardly through the slot 32 and through the plate 33 to preferably thread into the cylindrical anvil 35 which has its periphery beveled as indicated by the numeral 36 to provide the desired angle of set. An adjustable hammer 37 is threadable through a nut 38 and the nut is connected to the free end of a spring arm 39 which has its opposite end anchored as indicated by the numeral 40 to the end of the plate 33 opposite the anvil 35. The arm 39 and hammer 37 are so arranged that when the setting unit is moved along the slot 32 to place the anvil under the ground tooth of the saw, the simple striking of the upper part of the hammer 37 will impart the correct angulation to the saw tooth. It is obvious that anvils 35 of contours appropriate to the work being done will replace others not so suited at the option of the operator. When the saw tooth setting unit is not in use it may be moved to the out-of-the-way position illustrated in Figures 1 and 2 of the drawings.

The circular saw mounting assembly comprises the transversely elongated block or plate 41 resting slidably on the top of the casting 27 and provided with a longitudinal slot 42 having beveled upper edges as indicated by the numeral 43, the ends of the slot being rounded as indicated by the numeral 44 with the bevel extending therearound. Positioned in the slot 42 is the squared portion 45 which is also positioned in the slot 32 of the casting 27, the element 45 having a beveled head 46 whose sides conformably slide on the bevel 43 of the slot 42. Depending from the element 46 is a bolt 48 which passes through a washer 49 engaging the bottom of the web of the casting 27 as shown in Figure 4, a nut 50 being threaded on the bolt below the washer for clamping the bolt to fix the block 41 in a transversely and longitudinally adjusted position relative to the casting 27 in accordance with the contour and the angulation of the cutting edge of the teeth of the saw being reconditioned.

From the forward end of the block 41 rises a hollow hub 51 on the upper edges of which the circular saw 52 is adapted to rest as indicated in Figure 4. A saw clamping bolt 53 has circumposed thereon an inverted frustro-cone 54 which is adjusted along the bolt 53 so as to be received in the opening 55 in the center of the saw 52 in accordance with the size of this opening. The lower end of the bolt 53 is anchored as indicated by the numeral 56 in the plate 41 and a nut 57 is provided on the upper side of the bolt for bearing down upon the frustro-cone 54 for clamping the saw securely in place.

Swingably circumposed on the exterior of the hub 51 is the head 59 of the ratchet arm 60 which extends radially outwardly from the head, and keyed on the upper part of the hub 51 above the ratchet head 59 is the ratchet tooth equipped annulus 61. The ratchet arm has a spring-pressed pawl 62 positioned to engage the ratchet teeth 61 as shown in Figure 3. The ratchet arm 60 has also a longitudinal slot 63 slidably accepting a bolt 64 traversing the saw clamping block 65 whereby the adjacent edge portion of the saw is clamped between the block 65 and the top surface of the ratchet arm 60 as illustrated in Figure 1, to hold the saw operatively in place. It is obvious that by swinging the ratchet arm 60 toward the right in Figure 3 of the drawings, a predetermined number of the ratchet teeth, movement to restore the ratchet arm to the starting position moves the saw a corresponding number of teeth relative to the emery wheel.

With the saw 52 properly clamped in position as indicated and the proper shaped emery wheel in place, the saw is ready to be sharpened by moving the casting 27 toward the emery wheel until the stop bracket 28 strikes the side of the upper element of the bracket 29. The casting 27 is then retracted toward the right and the ratchet arm 60 moved one or two notches as required or until the ratchet handle strikes the emery wheel structure on either side. The nut on the saw clamp arrangement is then tightened to securely hold the saw in place, whereupon the clamping block assembly 65 is loosened and the ratchet handle swung back far enough to provide for finishing the remaining teeth to be sharpened or trued, whereupon the casting 27 is moved toward the left until the stop bracket 28 engages again the bracket 29, when the saw and the particular tooth to be ground by the emery wheel will be in proper position for this operation.

To set the teeth after they have been ground in the manner indicated, the positioning stud 34 of the setting unit is loosened and the unit moved along toward the left to proper position under the saw tooth involved. By moving the ratchet arm the proper number of teeth, the teeth of the saw are properly positioned on the anvil 35 to be set by striking the hammer 37. It is obvious that the plate 33 can be swung toward the right or toward the left to give the proper angle of set to the teeth.

A saw rest in the form of a block 66 rises from the left hand extremity of the top of the casting 27 and this includes a bolt 67 rising therefrom and traversing a clamping block 68 which clamps between it and the top of the rest 66 a ruler 69 having longitudinally spaced graduations 70 thereon and along the front edge thereof, the ruler being in a position to overlie the saw 52 and to extend longitudinally and with its front edge along the rear side of the emery wheel 12 and along the rear side of the edge 71 of the particular saw tooth being reconditioned. The ruler provides a straight edge for lining up the emery wheel and the tooth edge and at the same time provides a depth gauge for predetermining the depth of cut of the emery wheel.

Although I have shown and described herein a preferred embodiment of my invention, it is to be definitely understood that I do not desire to limit the application of my invention thereto, and any change or changes may be made consistent with the scope of the subjoined claim.

Having described the invention, what is claimed as new is:

Saw grinding apparatus comprising a base, an elongated table above said base, a grinding disk adjacent one end of the table rotatable in a vertical plane, saw indexing means on said table constructed and arranged to support a saw in a horizontal position for grinding of teeth thereof by said disk, means to mount said table on said base comprising transverse guide plates beneath said table arranged on edge and having recessed upper edges in which said table is slidably fitted for endwise movement toward and from said disk to operatively engage said disk with said teeth, arcuately slotted plates on said base complemental to said guide plates, and bolts extending from said guide plates into said slots whereby said table is tiltable transversely into different set positions to correspondingly tilt the saw relative to said disk and thereby effect variable beveling of the teeth by said disk, and a variably settable stop on said table constructed and arranged to abut one of said guide plates under movement of the table toward said disk to variably limit such movement of said table.

ROBERT K. WEILAND.